United States Patent [19]

Higuchi et al.

[11] Patent Number: 4,730,804
[45] Date of Patent: Mar. 15, 1988

[54] SEAT SLIDE RAIL DEVICE

[75] Inventors: Kazuo Higuchi; Takayuki Sugama, both of Utsunomiya; Kiichi Sasaki, Wako; Tadanori Honda, Utsunomiya, all of Japan

[73] Assignee: Honda Giken Kogyo Kabushiki Kaisha, Tokyo, Japan

[21] Appl. No.: 790,036

[22] Filed: Oct. 22, 1985

[30] Foreign Application Priority Data

Oct. 26, 1984 [JP] Japan .................. 59-225338
Nov. 2, 1984 [JP] Japan .................. 59-231762
Nov. 2, 1984 [JP] Japan .................. 59-166603[U]

[51] Int. Cl.⁴ .......................................... F16M 13/00
[52] U.S. Cl. ................................... 248/429; 297/344
[58] Field of Search ............... 248/429, 430; 297/344

[56] References Cited

U.S. PATENT DOCUMENTS

| 2,006,149 | 6/1935 | Potter | 297/344 X |
| 4,168,051 | 9/1979 | Terada | 248/429 |
| 4,209,159 | 6/1980 | Becker et al. | 248/430 |
| 4,478,383 | 10/1984 | Urai | 248/429 |
| 4,483,504 | 11/1984 | Duwelshoft | 248/429 |
| 4,487,459 | 12/1984 | Rees | 248/429 X |
| 4,615,551 | 10/1986 | Kinaga et al. | 248/429 X |

FOREIGN PATENT DOCUMENTS

| 2716549 | 11/1977 | Fed. Rep. of Germany | 248/429 |
| 152629 | 11/1980 | Japan | 248/429 |
| 687090 | 2/1953 | United Kingdom | 248/430 |

Primary Examiner—Ramon S. Britts
Assistant Examiner—Blair M. Johnson
Attorney, Agent, or Firm—Lyon & Lyon

[57] ABSTRACT

A seat slide rail structure comprising a lower rail having a channel member with a C-shaped cross-section fixedly attached to a floor and having an open side end; a slider, fixedly secured to a seat, having a vertical portion opposing the open side end and combined with the lower rail in axially slidable manner; a lock member rotatably supported by the slider and adapted to be rotated by actuating means; a lower member depending from the lower rail; and a slider extension bent from a lower end of the slider so as to oppose both surfaces of the lower member may engage each other even when a high lateral load is applied to the seat slide rail structure. A seat slide rail device typically comprises a master and a slave seat slide rail structure, and the former has lock teeth which can selectively engage with lock holes of the lower rail by a manual actuating means while the latter has lock teeth which synchronize with the other lock teeth and selectively engage with lock holes of the lower rail of the slave seat slide rail structure. In order to assure full engagement of the slave lock teeth with the corresponding lock holes, the slave lock teeth are provided with tapers which are greater than those of the master lock teeth, and/or the slave lock member is axially slidable so that any misalignment between the lock teeth and the lock holes may be accommodated.

23 Claims, 16 Drawing Figures

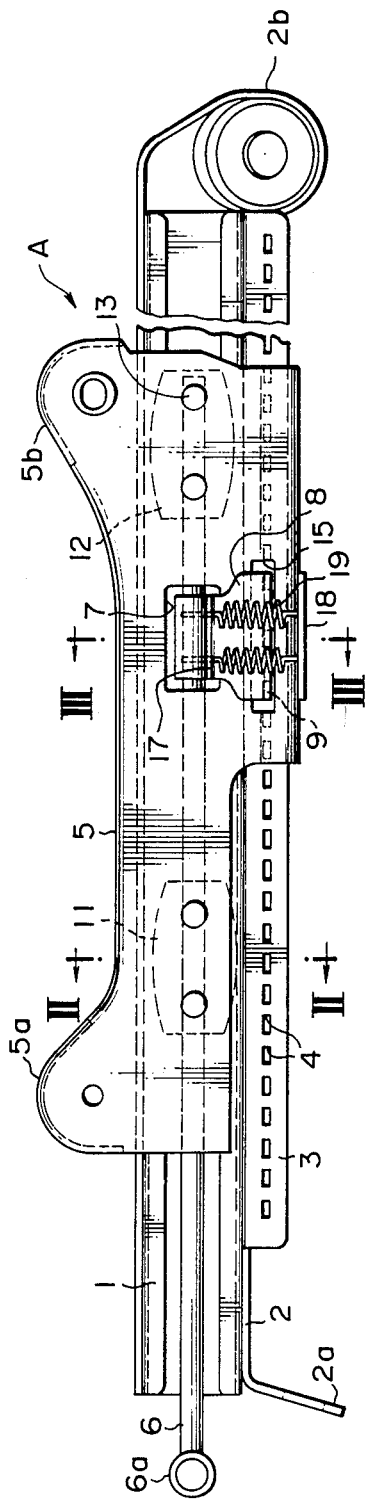
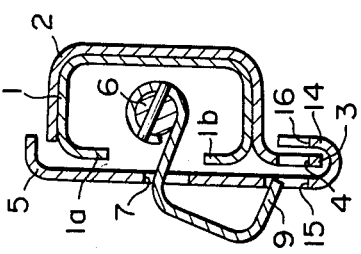
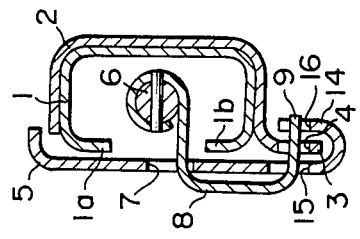
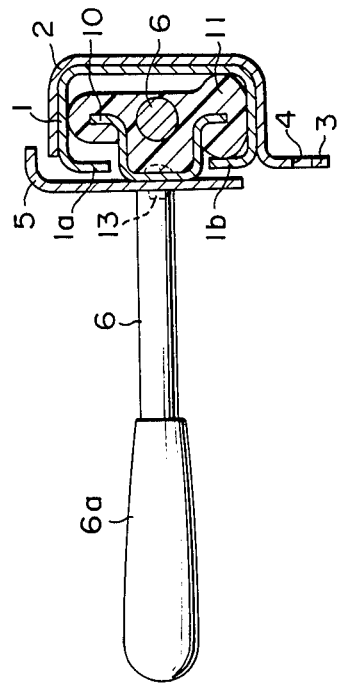

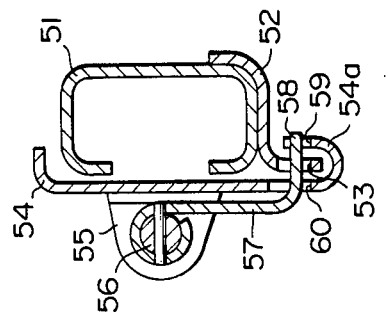
FIG. 5  FIG. 6  FIG. 7
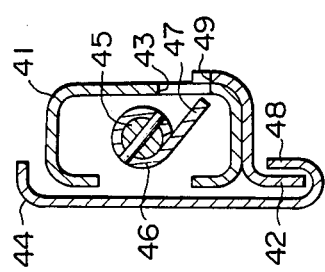
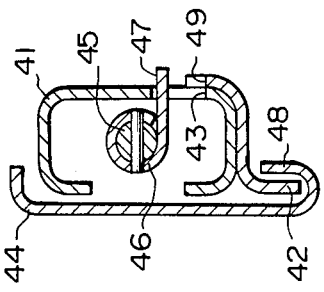
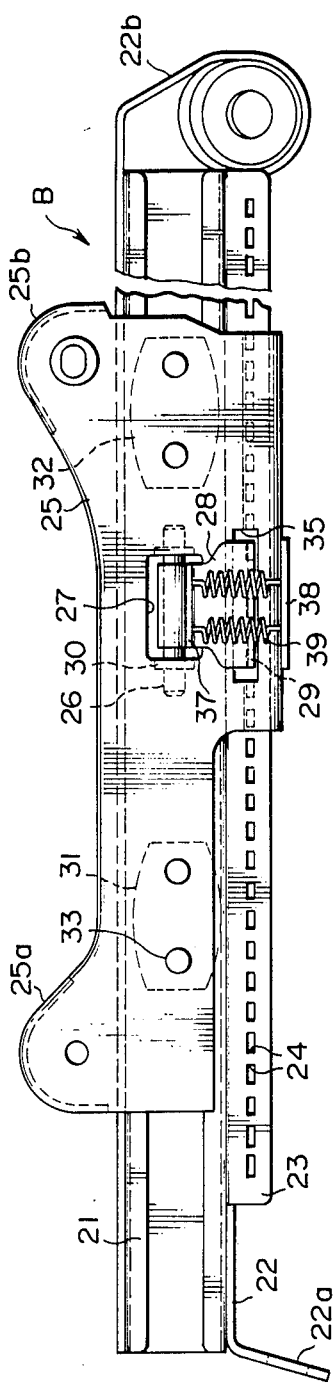
FIG. 8

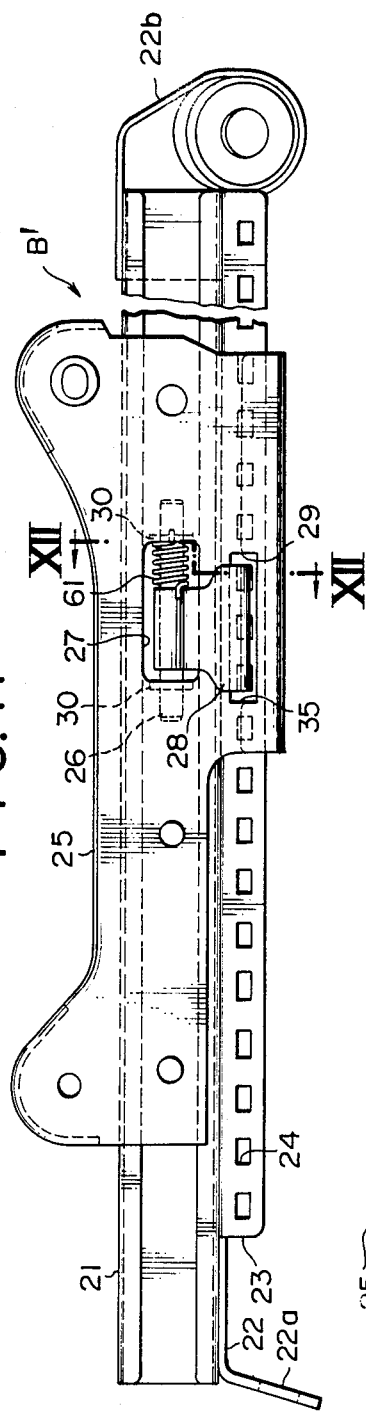
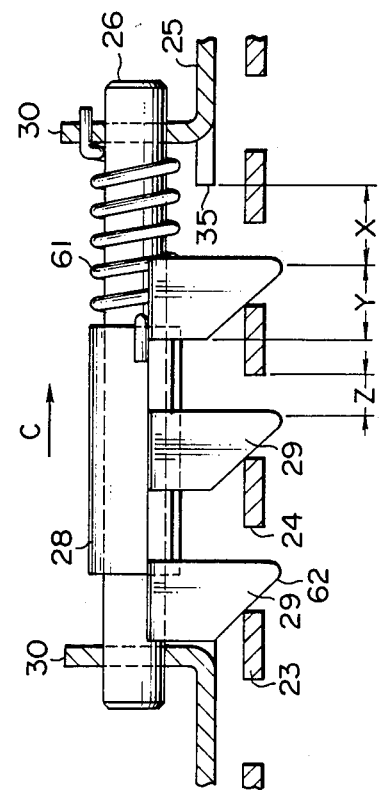
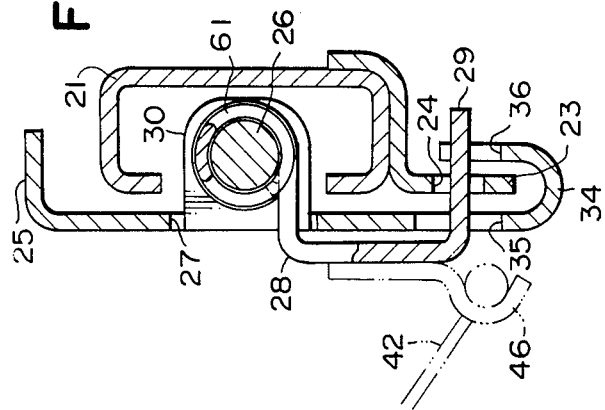
FIG. 11
FIG. 13
FIG. 12

SEAT SLIDE RAIL DEVICE

This invention relates to a seat slide rail device for adjusting the position of a vehicle seat along the fore-and-aft direction, and in particular to such a seat slide rail device which comprises a pair of seat slide rail structures provided under the both sides of a vehicle seat in a mutually parallel relationship.

Conventionally, seat slide rail structures of various forms have been in use for adjusting the fore-and-aft position of a vehicle seat, and, since the thickness of seat slide rail members has been required to be fairly great in order to assure sufficient mechanical strength and rigidity, the problems of high manufacturing cost and increased vehicle weight have been in existence.

For instance, in a conventional seat slide rail structure, a lower rail consisting of a channel member having a C-shaped cross-section is fixedly secured to the floor surface with its open side facing upward and a slider member also consisting of a similar channel member is fixedly secured to the seat with its open side facing downward. And, the slider receives the lower rail, with rollers made of coil springs being interposed therebetween, in such a manner that the slider may be moved along the lower rail in a substantially frictionless manner. To fix the slide position of the seat, lock teeth which are pivoted to the slider are engaged with selected ones of lock holes provided in the lower rail by turning a lock lever shaft which is integrally connected to the lock teeth.

In such a known seat slide rail structure, since both the slider and the lower rail are made of channel members having upper and lower open ends, respectively, the thickness of the channel members has to be substantially great in order to assure enough bending rigidity against the load of the seat. Furthermore, the lock holes which are typically formed in the lower rail reduce the mechanical strength and the rigidity of the lower rail, and the thickness of the lower rail must be great enough to be able to securely hold the lock teeth engaged with the lock holes.

Such a lock mechanism is, in some cases, provided only in one of the two seat slide rail structures making up a seat slide rail device for one vehicle seat, but, in most cases, for the purpose of increasing the mechanical strength of the locking mechanism and the rigidity of the overall seat slide rail device, both the seat slide rail structures are provided with locking mechanisms.

Typically, the lock mechanism of one of the seat slide rail structures or the master lock mechanism is driven manually by a handle, and the motion of the master lock mechanism is transmitted to the lock mechanism of the other seat slide rail structure or the slave lock mechanism by means of a wire cable and so on.

In such a double lock mechanism, if a deformation causing a longitudinal displacement between the two seat lside rail structures or a diagonal deformation is developed in the seat slide rail device, the slave lock mechanism may not be able to properly lock even when the masterlock mechanism is properly engaged, and the overall mechanical strength of the lock mechanism may be impaired.

It is possible to have the engagement between the lock teeth and the lock holes of the slave lock mechanism a loose one so that the slave lock mechanism may achieve a full engagement at all times, a resulting play in the slave lock mechanism may produce undesirable results. Furthermore, by increasing the difference of dimensions of the widths of the lock teeth and the lock holes, the width of the lock teeth is reduced and/or the width of the lock holes is increased whereby the overall mechanical strength is reduced.

Alternatively or additionally, the diagonal rigidity of the seat may be increased so as to avoid any misalignment between the lock teeth and the lock holes of the slave seat slide rail structure. However, it will increase the weight of the seat and the cost of manufacture.

In view of such shortcomings of the prior art, a primary object of this invention is to provide a seat rail structure which can assure required rigidity, and is economical in cost and light in weight.

Another object of this invention is to provide such a seat slide rail structure which is compact.

Yet another object of this invention is to provide a double lock mechanism for a seat slide rail device having a slave lock mechanism which is free from play and can accomplish a full engagement at all times.

Yet another object of this invention is to provide a lock structure for a seat slide rail device according to which reliable locking engagement is possible even when there are some positional errors between the lock tooth and the lock holes.

According to this invention, such objects are accomplished by providing a seat slide rail structure, comprising: a lower rail having a channel member with a substantially C-shaped cross-section fixedly attached to a floor surface and having an open side end; a slider, fixedly secured to a seat, having a vertical portion opposing the open side end of the lower rail and combined with the lower rail in axially slidable manner by way of a bearing member; and a lock member rotatably supported by a lock lever shaft, which is in turn supported by the slider, and adapted to be rotated by an actuating means, further comprising: a lower member depending from a lower portion of the lower rail; and a slider extension bent from a lower end of the the slider so as to oppose both surfaces of the lower member; the slide position of the seat being adjustable by selective engagement of a lock tooth formed in a free end of the lock member, which is fixedly secured to the lock lever shaft, and a plurality of lock holes provided in the lower rail.

Since the lower rail is made of a C-channel with its open end facing sideways, it has a high bending rigidity and mechanical strength against the vertical load which the seat slide rail structure receives from the seat. Since the slider extension partially surrounds the lower member depending from the lower rail, when the seat slider rail structure is subjected to a lateral load, the lower rail and/or the slider will deform to the extent that the slider extension comes into engagement with the lower member, and the slider and the lower rail will form a structurally integral body which has a sufficiently great mechanical strength and rigidity.

According to a certain embodiment of the present invention, the lock teeth pass through a slot formed in the slider and/or a notch or a hole provided in the free end of the slider extension, the mechanical strength of the lock holes are improved and the effective contact area between lock teeth or the lock member with the lock holes or the slider is increased.

According to another aspect of the present invention, the lock member has a plurality of lock teeth and at least one of the lock teeth is substantially closely fitted into the lock holes while at least one other lock tooth is loosely fitted into the lock holes. Therefore, the closely fitted lock tooth effectively eliminates any play between the slider and the lower rail once the tooth is fully engaged with one of the lock holes, and the loosely fitted lock tooth assures a sufficient mechanical strength by engaging the edge of the lock hole when a great force is applied between the slider and the lower rail while the closely fitted lock tooth or the corresponding lock hole is slightly deformed.

According to yet another aspect of the present invention, the lock member is provided with a pluraity of lock teeth which may be provided with tapers to assure full engagement with lock holes at all times. In particular, the lock teeth of the slave seat slide structure are preferably provided with tapers which can correct any misalignment between the lock teeth and the lock holes by being pushed into the lock holes.

According to yet another aspect of the present invention, the lock member of the slave seat slide rail structure is axially moveable along the lock shaft and is biased by a spring or a pair of springs so that any misalignment between the lock teeth and the lock holes may be accommodated by the axial displacement of the lock member along the lock shaft.

According to yet another aspect of the present invention, the tapers of the lock teeth of the slave seat slide rail structure are greater than those of the lock teeth of the master seat slide rail structure so that the all the lock teeth may safely fit into the corresponding lock holes even when a diagonal deformation has developed in the seat slide rail device.

Now this invention is described in the following in terms of preferred embodiments with reference to the appended drawings, in which:

FIG. 1 is an overall side view of a master seat slide rail structure according to this invention;

FIG. 2 is a sectional view taken along line II—II of FIG. 1;

FIG. 3 is a sectional view taken along line III—III of FIG. 1;

FIG. 4 is a view similar to FIG. 3, showing the state in which the lock teeth are disengaged from the lock holes;

FIG. 5 is a view similar to FIG. 3, showing another embodiment of this invention;

FIG. 6 is a view similar to FIG. 5, showing the state in which the lock teeth are disengaged from the lock holes;

FIG. 7 is a view similar to FIGS. 3 and 5, showing yet another embodiment of this invention;

FIG. 8 is a view similar to FIG. 1, showing an embodiment of a slave seat slide rail structure, according to this invention, which may be used in combination with the master seat slide rail structure of FIG. 1;

FIG. 11 is a general side view of another embodiment of the slave seat slide structure according to this invention;

FIG. 12 is a sectional view taken along line XII—XII of FIG. 11;

FIG. 13 is a bottom view of a part of the seat slide rail structure of FIG. 11 showing a state preceding the fitting of lock teeth into lock holes when there is some positional error between the lock teeth and the lock holes;

FIG. 1 is an overall schematic side view of a master seat slide rail structure A according to this invention. A seat slide rail device typically comprises a master seat slide structure which has a lock mechanism and a slave seat slide structure which may or may not have a lock mechanism.

Figure 9:
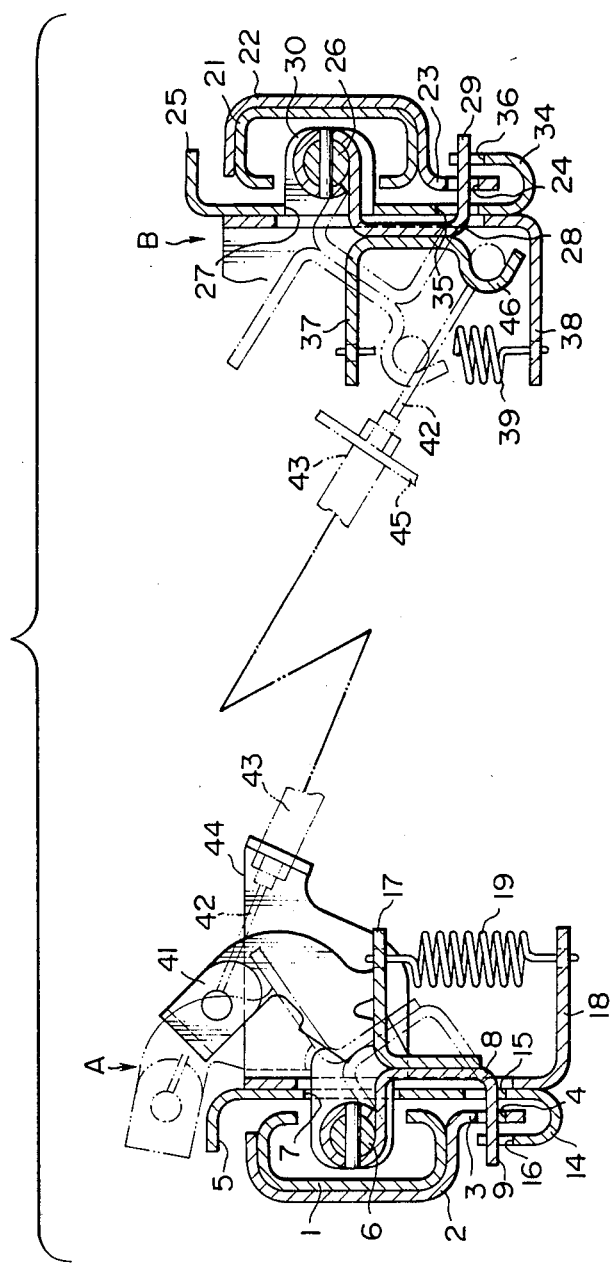
FIG. 9 is a conceptual sectional view showing the structure of an embodiment of the double lock mechanism according to this invention.

In this master seat slide rail structure A, a lower rail 1 is generally reinforced by a reinforcing member 2 and is fixedly secured to a floor by way of mounting brackets 2a and 2b which are formed at both longitudinal ends of the reinforcing member 2, while a slider 5 is fixedly secured to a seat, which is not shown in the drawings, by way of mounting brackets 5a and 5b formed at the top portions of the longitudinal ends of the slider 5.

As clearly shown in FIG. 2, the lower rail 1 has a generally C-shaped cross-section with its open side facing the slider 5 and a pair of flanges 1a and 1b extending into the open side thereof from above and below. Support members 10 having a cross-section in the shape of Greek letter omega are fixedly secured to the slider 5 by rivets 13 and bearing members 11 and 12 consisting of durable synthetic resin integrally molded with the support members 10 are generally located inside the lower rail 1 in such a manner that the slider 5 may freely slide along the lower rail 1 by way the bearing members 11 and 12..

A lock lever shaft 6 is rotatably supported by the bearing members 11 and 12 and extends along the central axial line of the bearing members 11 and 12. A lock member 8 is fixedly secured to a portion of the lock lever shaft 6 which opposes an opening 7 provided in the slider 5. Further, a lower portion 3 extending downwardly from the lower end of the reinforcing member 2 is provided with a row of lock holes 4 at equal intervals along the axial direction.

As shown in FIG. 3, the lock member 8 which is fixedly secured to the lock lever shaft 6 extends outwardly through the opening 7 of the slider 5, bends downwardly, then bends inwardly and passes through a guide slot 15 provided in a lower part of the slider 5. The free end of the lock member 8 is provided with a plurality of teeth 9 which pass through the guide slot 15, the lock holes 3 provided in the lower portion 3 and a notch 16 provided in a free end of an extension 14 of the slider 5 which is upwardly bent in an arcuate manner, thus partially surrounding the lower portion 3 in the shape of letter "J" and opposing two surfaces of the lower portion 3 depending from the lower rail 1.

As best shown in FIGS. 1 and 9, a bracket 17 having a cross-section in the shape of letter "L" is fixedly secured to the portion of the lock member 8 which extends externally of the slider 5, and another bracket 18 likewise having a cross-section in the shape of letter "L" is fixedly secured to a lower portion of the slider 5 and extends outwardly. A pair of tension coil springs 19 are engaged between the two brackets 17 and 18.

Now the action of this embodiment is described in the following with reference to FIGS. 1 through 4. In FIGS. 3 and 4, the brackets 17 and 18 and the coil springs 19 are omitted for the convenience of illustration.

The lock member 8 is normally biased toward the position shown in FIG. 3 in which the lock teeth 9 are engaged with the guide slot 15, the lock holes 4 and the notch 16 under the spring force of the coil springs 19. Since the lock teeth 9 engage with the lock holes 4 in this state, the slider 5 is fixed relative to the lower rail 1 or the floor surface. When the lock lever shaft 6 is turned in clockwise direction in the sense of FIGS. 2 and 3 by a handle 6a of the lock lever shaft 6 against the spring force of the coil springs 19, the lock teeth 9 are disengaged from the lock holes 4 as shown in FIG. 4 and the slider 5 becomes freely moveable along the axial direction relative to the lower rail 1 by way of the bearing members 11 and 12. When a desired slide position is obtained, the lock lever shaft 6 is released and, by counter-clockwise rotation of the lock member 8 under the spring force of the coil springs 19, the lock teeth 9 fit into the lock holes 4, thereby achieving the state shown in FIG. 3 where the slider 5 is again fixed relative to the lower rail 1.

According to this embodiment, since the lock lever shaft 6 is rotatably supported by the bearing members 11 and 12 in a convenient manner and, also, extends inside the lower rail 1, the overall structure is very compact. Since the distance between the lock lever shaft 6 and the lock teeth 9 is short, rotation of the lock lever shaft 6 over a relatively small angle causes the engagement and disengagement of the lock teeth 9 with and from the lock holes 4 and the adjustment of the seat slide position will be simplified.

FIGS. 5 and 6 show another embodiment of a master seat slide rail structure according to this invention. In this case, a lower member 42 without any lock holes are securely attached to a lower part of a lower rail 41 and a slider extension 48 of a slider 44 is inwardly and upwardly bent in an arcuate manner, partially surrounding the lower member 42. Lock holes 43 are provided in a side end portion of the lower rail 41 opposite to the open side end. An upper portion of the lower member 42 adjacent to the lock holes 43 may be provided with a notch 49. A lock lever shaft 45 is provided with a fixedly secured lock member 46 which is shorter in length than the lock member 8 of the previous embodiment, and lock teeth 22 formed in a free end of the lock member 47 are adapted to fit into the lock holes 43.

This embodiment has the disadvantage that the rotational angle of the lock lever shaft in locking and unlocking the lock member in the process of adjusting the seat slide position is greater than that of the previous embodiment, but has the advantages that the lock member 46 may be shorter and is therefore more advantageous in assuring sufficient mechanical strength to the lock member and there is no need for providing a hole or a notch in the lower member 42 and the lower portion portion 48, thereby giving the lower rail 41 greater mechanical strength and rigidity.

FIG. 7 shows a third embodiment of this invention, which is identical to the first embodiment in that a lower member 52 is provided with lock holes 53, that the lower part of a slider 54 is bent around the lower end of the lower member 52, as a slider extension 54a, in an arcuate manner with its free end provided with a notch 59, and that a lock member 57 particularly its lock teeth 58 formed on its free end may pass through a guide slot 60 provided in the slider 54, lock holes 53 provied in the lower member 52 and the notch 59 formed in the free end of the lower part of the slider 54, but differs from the first embodiment in that a lock lever shaft 56 is rotatably supported by the slider 54 by way of a bracket 55 so that the lock lever shaft 56 extends along and outside of the side end of the lower rail 51.

According to this embodiment, the overall structure may not be as compact as the first embodiment since the lock lever shaft 56 is rotatably supported externally of the slider 54 and the lower rail 41, but it has the advantages that the rotational angle of the lock lever shaft 56 is small in accomplishing the slide adjustment of the seat and that the structure for supporting the lock lever shaft 56 is simpler and the manufacturing process therefore may be simplified.

According to the above-described embodiments, in addition to the various advantages of each of the embodiments, the bending rigidity of the overall slide rail structure is high even when the thicknesses of the members are relatively small because the heights (vertical dimensions) of the lower rail 1, 41 and 51 and the upper rail 5, 44 and 54 may be sufficiently great. When excessive lateral load is applied to the seat slide structure, by engagement of the curved slider extension 48 of the slider 5, 44 and 54 with the lower portion 3 and 23 or the lower member 42 and 52 securely attached to the lower rail 1, 41 and 51, sufficient mechanical strength is assured. Therefore, required rigidity and mechanical strength may be attained using members of relatively small thicknesses.

FIG. 8 shows a slave seat slide rail structure B according to this invention, likewise comprising a lower rail 21 and a slider 25 which are combined together in an axially slidable manner by bearing members 31 and 32 which are fixedly secured to the upper rail 25 by rivets 33, and has a structure similar to that of the master seat slide rail structure A.

Namely, the lower rail 21 is generally reinforced by a reinforcing member 22 and is fixedly secured to a floor by way of mounting brackets 22a and 22b which are formed at the longitudinal ends of the reinforcing member 22, while the slider 25 is fixedly secured to a seat which is not shown in the drawings by way of mounting brackets 25a and 25b formed at the top portions of the longitudinal ends of the slider 25. As clearly shown in FIG. 9, the lower rail 21 has a generally C-shaped cross-section with its open side facing the slider 25.

A slave lock shaft 26 is rotatably supported by tabs 30 formed in the slider 25 adjacent to an opening 27 of the slider 25 and extends inside the lower rail 21 along the central axial line thereof. A lock member 28 is rotatably supported by the lock shaft 26. Further, a lower portion 23 which is integral with the lower rail 21 is provided with a row of lock holes 23 at equal intervals along the axial direction.

As shown in FIG. 9, the lock member 28 which is rotatably supported by the slave lock shaft 26 extends through the opening 27 of the slider 25, then bends downwardly and inwardly, and passes through a guide slot 35 provided in a lower part of the slider 25. More specifically, lock teeth 29 formed in the free end of the lock member 38 pass through the guide slot 27 formed in the slider 25, the lock holes 24 provided in the lower member 23 and a notch 36 provided in a free end of a lower portion 34 of the slider 25 which is upwardly bent in an arcuate manner, thus surrounding the lower portion of the lower member 23 in the shape of letter "J" and opposing both surfaces of the lower member 23.

As best shown in FIG. 9, a bracket 37 having a cross-section in the shape of letter "L" is fixedly secured to the portion of the lock member 28 which extends externally of the slider 25, and another bracket 38 likewise having a cross-section in the shape of letter "L" is fixedly secured to a lower portion of the slider 25 and extends outwardly. A pair of tension coil springs 39 are engaged between the two brackets 37 and 38.

As shown in FIG. 9, an end of an inner cable 42 of a control cable is connected to the lock member 8 of the master slide rail structure A by way of an engagement bracket 41 and the other end of the inner cable 42 is engaged to an engagement portion 46 of the brackekt 37 of the slave seat slide rail structure B while the two ends of the outer cable 43 of the control cable are connected to the sliders 5 and 25 of the master and the slave seat slide rail structures A and B by way of brackets 44 and 45, respectively.

Therefore, when the lock lever shaft 6 of the master seat slide rail structure A is turned in counter-clockwise direction in the sense of FIG. 9 against the spring force of the tension coil springs 19, the lock teeth 9 are disengaged from the lock holes 4. At the same time, the other end of the inner cable 42 engaged to the engagement portion 46 is pulled and the lock member 38 is rotated, by way of the engagement portion 46 by the inner cable 42, about the shaft 26 in clockwise direction in the sense of FIG. 9 to thereby disengage the lock teeth 29 from the lock holes 24. Thus, by disengaging the lock teeth 9 and 29 from the lock holes 4 and 24 at the same time, the seat slide position may be adjusted in the fore-and-aft direction and, by fitting the lock teeth 9 and 29 into corresponding ones of the lock holes 4 and 24, the seat may be fixed at a new adjusted slide position.

Figure 10:
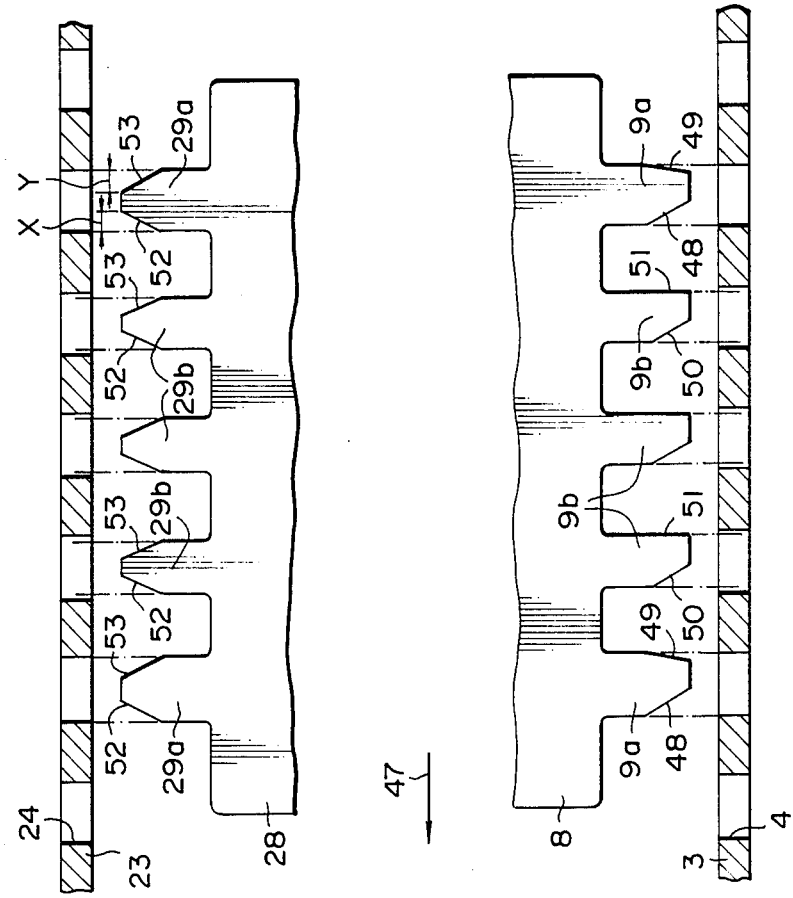
FIG. 10 is a conceptual plan view showing the positional relationship between the lock teeth and the lock holes of the double lock mechanism of a seat slide rail device using the master seat slide rail structure of FIG. 1 and the slave seat slide rail structure of FIG. 8.

FIG. 10 is an illustrative view showing the positional relationship between the lock teeth 9 and 29 and the corresponding lock holes 4 and 24. The master lock member 8 has five lock teeth 9a and 9b, and the widths of the frontmost and the rearmost teeth 9a are so selected that they closely fit into the lock holes 4 while the widths of the three middle teeth 9b are made smaller so that they may fit into the lock holes 4 even when there are some dimensional errors. Therefore, once the lock teeth 9a and 9b have been fitted into the lock holes 4, there is no play in the fore-and-aft direction on account of the foremost and rearmost teeth 9a closely fitting into the corresponding lock holes 4 and, when an excessive force is applied, such as during an vehicle collision, between the lock teeth 9 or the slider 5 and the lock holes 4 or the lower rail 1, all the five teeth 9a and 9b can engage with the peripheral portions of the lock holes 4 by deformation of the lower portion 3 or the lock holes 4 and/or the slider 5 or the lock teeth 9a, and required mechanical strength will be assured.

The leading edges and the trailing edges of the frontmost and the rearmost teeth 9a of the master lock member 8 are provided with tapers 48 and 49, respectively, but the tapers 49 of the trailing edges are slight as compared to those of the leading edges. The leading edges of the middle teeth 9b are provided with tapers 50 similar to the tapers 48, but the trailing edges of the middle teeth 9b may be almost without any tapers because the middle teeth 9b are narrower and therefore do not require the additional taper 49 for assuring entry into a lock hole 4.

The slave lock member 28 are likewise provided with five teeth 29a and 29b, and the widths of the frontmost and the rearmost teeth 29a are so selected that they closely fit into the lock holes 24 while the three central teeth 29b are made smaller so that they may fit into the lock holes 24 defining certain gaps therebetween. Therefore, in the same manner as the master lock teeth 9, the frontmost and the rearmost teeth 29a eliminate the play in the fore-and-aft direction while all the five teeth 29a and 29b assure the required mechanical strength when an excessive force is applied between the lock teeth 29 or the lower rail 21 and the lock holes 24 or the upper rail 25, by deformation of mainly the lock teeth 29a.

Since the leading and the trailing edges of the lock teeth 29a and 29b of the slave lock member 28 are all provided with tapers 52 and 53, even when a diagonal deformation is developed between the two seat slide rail structures, all the lock teeth 29a and 29b can safely fit into the lock holes 4 by the tapers 52 to 55 of the leading and the trailing edges of the lock teeth 19a and 19b of the slave lock member 28 engaging the peripheral portions of the lock holes 4 without fail. As a matter of fact, if the widths of the tapers 52 and 53 of the leading and the trailing edges of the teeth 29a and 29b of the slave lock member 28, as projected onto the lower rail 21, are x and y, respectively, then, once the master lock teeth 9 have been fitted into the lock holes 4, the teeth 29a and 29b can be all fitted into the corresponding lock holes 24 even when there is a relative displacement or a diagonal deformation of x or y in the fore and aft directions between the teeth 29a and 29b of the slave lock member 28 and the lock holes 24 of the lower portion 23 attached to the lower rail 21.

The embodiment of FIGS. 9 and 10 applies to a right seat of a vehicle. In other words, the forward direction of the vehicle is indicated by an arrow 47 and the master seat slide structure is located on the inner side or the left side of the seat. This is so because the inner seat slide rail structure is more important than the outer seat slide structure in that the buckle end of a seat belt is normally attached to the inner seat slide rail structure. Therefore, the left seat of the vehicle may be provided with a structure which is symmetric to that shown in FIGS. 9 and 10.

Thus, according to this embodiment, by selecting the tapers of the projections of the slave lock teeth to be greater than those of the master lock teeth, the slave lock teeth will be always fully locked and the mechanical strength of the lock mechanisms for a vehicle seat can be simply and reliably assured.

FIG. 11 shows yet another embodiment of this invention which may be used as a slave seat slide structure B'. In FIG. 11, the parts corresponding to those of FIG. 8 are denoted with like numerals and description thereof is omitted.

A slider 25 is provided with an opening 27, and a shaft 26 is supported by a tab 30, which is bent inwardly afater being cut out to define the opening 27, in both slidable and rotatable manner along and about the axial line of the slider 25. A slave lock member 28 is fixedly secured to the shaft 26. The range of the axial motion of the lock member 28 is determined by the two longitudinal ends 35 of a guide slot 29. A plurality of lock holes 24 are formed in a lower portion 23, which depends from a reinforcing member 23 for a lower rail 21, at equal intervals along the axial line.

As best shown in FIG. 12, the lock member 28 which is fixedly secured to the shaft 26 extends outwardly from the opening 27, then bends downwardly and bends inwardly, so that lock teeth 29 formed in the free end of the lock member 28 pass through the guide slot 35 formed in a lower portion of the slider 25, the lock holes 24 formed in the lower portion 23, and a notch 36 formed in a free end of a slider extension 34 which is formed by bending a lower portion of the slider 25 upwardly in the shape of letter "J" so as to oppose both the surfaces of the lower portion 23.

A coil spring 61 is fitted over the shaft 26 and interposed between the lock member 28 and one of the tabs 30. One end of the coil spring 61 is engaged to the lock member 28 while the other end of the coil spring 61 is engaged to the tab 30. Thus, the lock member 28 is not only biased in counter-clockwise direction in the sense of FIG. 12 about the shaft 26 but is also biased leftwardly in the sense of FIG. 11 along the axial direction.

Further, a wire cable 42 is connected to a wire engagement portion 46 which is fixedly secured to the lock member 28 so that the actuating force of a lock lever shaft of a master seat slide rail structure may be transmitted to a the slave lock member 28.

When a tension is applied to the wire cable 42 in this state, the lock member 28 is rotated in clockwise direction against the twisting force of the coil spring 61 and the lock teeth 29 are disengaged from the lock holes 24 and the slider 25 becomes freely slidable along the fore-and-aft direction relative to the lower rail 21. When a desired slide position is obtained, the tension of the wire cable 42 is released and the lock member 28 rotates towards the lower portion 23 under the twisting biasing force of the coil spring 61 with the result that the lock teeth 29 fit into different ones of the lock holes 24 and a new seat slide position is obtained.

Now the action of the present embodiment is more specifically described in the following with reference to FIGS. 13 and 14 which schematically illustrate the relationship between the lock teeth and the lock holes.

Figure 14:
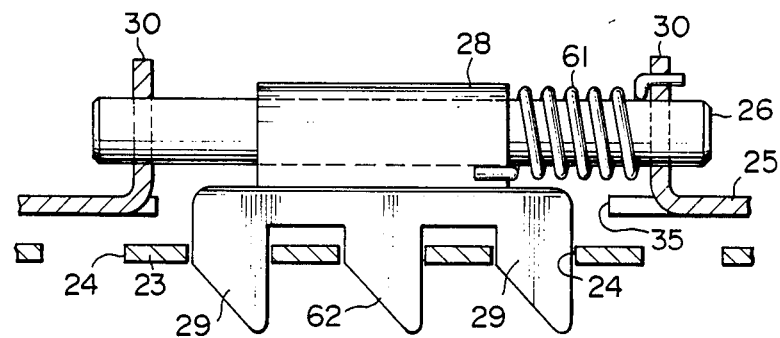
FIG. 14 is a view similar to FIG. 13 showing a state in which the lock teeth are fully fitted into the lock holes.

Even when there is a diagonal deformation causing a displacement Z between the lock teeth 29 and the lock holes 24 in the slave seat slide rail structure B' as shown in FIG. 13 while the master lock teeth have been fitted into the corresponding lock hole, as part of the tips of the lock teeth 29 enter the lock holes 24, the tapers 62 provided in the leading edges of the lock teeth 29 push the edges of the lock holes 24 and the lock member 28 is axially displaced as indicated by an arrow C in FIG. 13 under the twisting force of the coil spring 61 which forces the lock teeth 29 into the lock holes 24, eventually fitting the lock teeth into the lock holes to the full extent as shown in FIG. 14.

As a matter of fact, if the stroke of the axial mation of the lock member 28 is X and the width of the lock teeth 29 is Y, even when the lock teeth 29 are displaced from the lock holes 4 by the distance Z in one direction, as long as $Z < X$ (if $X < Y$) or
$Z < Y$ (if $X > Y$)

the lock teeth 29 may be fully fitted into the lock holes 24.

There will be some play even when the lock teeth have fully fitted into the lock holes to the extent that the lock member 28 is movable along the axial direction against the spring force of the coil spring 61, but its effect is alleviated by the axial biasing force produced by the coil spring 61.

Figure 15:
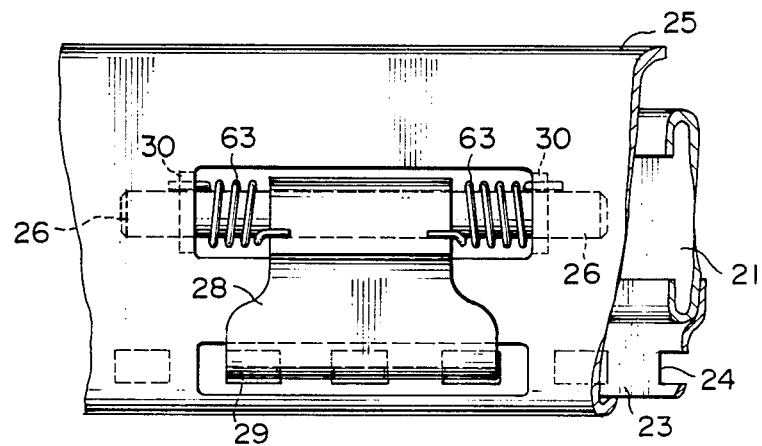
FIG. 15 is a magnified side view of an essential portion of yet another embodiment of the slave slide rail structure according to this invention.
Figure 16:
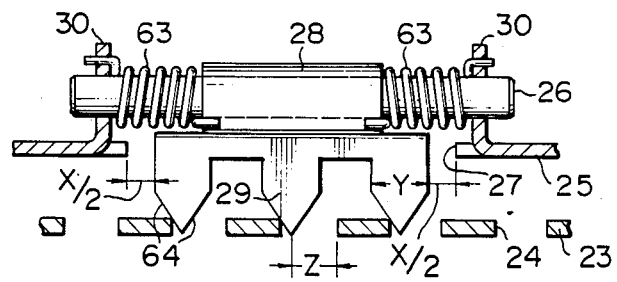
FIG. 16 is a view similar to FIG. 13, showing the working principle of the embodiment of FIG. 15.

FIGS. 15 and 16 show another embodiment of the present invention. In this case, coil springs 63 are provided on both ends of the lock member 28 and both side edges of the tips of the lock teeth 29 are provided with tapers 64. According to this embodiment, since the lock teeth 29 are always located in a substantially middle position in a free state, no matter whether the displacement Z between the lock teeth 29 and the lock holes 24 is in the fore or the aft direction, the lock member 28 is axially displaced by the action of either one of the tapers 64 tending to force the lock teeth 29 into the lock holes 24, and the lock teeth 29 will be fully fitted into the lock holes 24 in spite of some displacement between the lock teeth and the lock holes.

According to this embodiment, a displacement in either forward or rearward direction may be absorbed and, if the angle of the tapers is the same as that of the previous embodiment in which the tapers are is provided only on one sides of the teeth, the height of the lock teeth may be reduced.

In the above-described embodiments, the lock members are fixedly secured to the shafts so that the sliding and rotational motion may be achieved between the shafts 26 and the tabs 30, but is is also possible to fixedly secure the shafts 26 to the tabs 30 so that the sliding and rotational motion may be achieved between the shafts 26 and the lock members 28. Alternatively, it is possible to have the lock members 28 and the shafts 26 mutually rotatable and to have the shafts and the tabs mutually slidable. The coil springs 61 and 63 produced both of the axial and the rotational biasing forces in the above described embodiments, but it is also possible to use separate springs for these two biasing forces.

Thus, according to these embodiments by allowing a certain axial motion to the lock member relative to the slider and providing tapers in the lock teeth, a reliable lock becomes possible even when the alignment between the lock holes of the lower rail and the lock teeth of the slider is not favorable, and the last two embodiment are particularly effective in assuring favorable locking in a slave seat slide rail structure.

What we claim is:

1. A seat slide rail structure, comprising: a lower rail having a channel member with a substantially C-shaped cross-section fixedly attached to a floor surface and having an open side end; a slider, fixedly secured to a seat, having a vertical portion opposing the open side end of the lower rail and combined with the lower rail in axially slidable manner by way of a bearing member; and a lock member fixedly secured to a lock lever shaft which is in turn rotatably supported by the slider and adapted to be rotated by an actuating means, further comprising:

the bearing member being fixedly secured to the slider and positioned inside the lower rail;

the lock lever shaft positioned inside the lower rail and rotatably supported on the slider by the bearing member;

a lower member depending from a lower portion of the lower rail; and a slider extension bent from a lower end of the slider so as to oppose both surfaces of the lower member;

the slide position of the seat being adjustable by selective engagement of a lock tooth formed in a free end of the lock member and a plurality of lock holes provided in the lower rail.

2. A seat slide rail structure as defined in claim 1, wherein the lock holes are provided in the lower member depending from the lower rail and the lock tooth is adapted to fit into the lock holes, passing through a slot, which is provided in a vertical portion of the slider opposing one of the surfaces of the lower member, at the same time.

3. A seat slide rail structure as defined in claim 2, wherein the lock tooth further passes through a notch or a hole provided in a free end of the slider extension opposing the other surface of the lower member.

4. A seat slide rail structure as defined in claim 1, wherein the lock holes are provided in a side end of the lower rail opposite to the open side end thereof.

5. A seat slide rail structure as defined in claim 1, wherein a plurality of lock teeth are formed in a free end of the lock member which is securely attached to the lock lever shaft, and at least one of the lock teeth is adapted to substantially closely fit into the lock holes while at least one other lock tooth is adapted to loosely fit into the lock holes.

6. A seat slide rail structure as defined in claim 5, wherein a leading edge of the closely fitting tooth is provided with a taper while a trailing edge of the closely fitting tooth is provided with a slight taper.

7. A seat slide rail structure as defined in claim 6, wherein at least either one of a leading and trailing edges of the loosely fitting tooth is substantially without any taper.

8. A seat slide rail structure, comprising: a lower rail having a channel member with a substantially C-shaped cross-section fixedly attached to a floor surface and having an open side end; a slider, fixedly secured to a seat, having a vertical portion opposing the open side end of the lower rail and combined with the lower rail in an axially slidable manner by way of a bearing member; and a lock member rotatably supported by a lock shaft which is in turn supported by the slider, further comprising:
the bearing member being fixedly secured to the slider and positioned inside the lower rail;
the lock lever shaft positioned inside the lower rail and rotatably supported on the slider by the bearing member;
a lower member depending from a lower portion of the lower rail; and
a slider extension bent from a lower end of the slider so as to oppose both surfaces of the lower member;
the slide position of the seat being adjustable by selective engagement of a lock tooth formed at a free end of the lock member and adapted to be actuated by an actuating means into and out of a plurality of lock holes provided in the lower rail.

9. A seat slide rail structure as defined in claim 8, wherein the lock shaft is supported by a pair of tabs which are cut out from the slider to define an opening, and the lock member passes through the opening.

10. A seat slide rail structure as defined in claim 9, wherein the lock holes are provided in the lower member depending from the lower rail and the lock tooth is adapted to fit into the lock holes, passing through a slot which is provided in a vertical portion of the slider opposing one of the surfaces of the lower member, at the same time.

11. A seat slide rail structure as defined in claim 10, wherein the lock tooth further passes through a notch or a hole provided in a free end of the slider extension opposing the other surface of the lower member.

12. A seat slide rail structure as defined in claim 11, wherein the lock member is adapted to rotate and slide about and along the lock shaft and is biased by spring means both into the lock holes and along the lock shaft in one direction, and at least the leading edge of the lock tooth is provided with a taper.

13. A seat slide rail structure as defined in claim 12, wherein the spring means is a coil spring fitted over the lock shaft and engaged to the lock tooth at one end thereof and to the slider at the other end thereof.

14. A seat slide rail structure as defined in claim 11, wherein the lock member is adapted to rotate and slide about and along the lock shaft and is biased by spring means both into the lock holes and along the lock shaft in two directions, the spring means biasing the lock member towards a middle position along the lock shaft, and the leading and the trailing edges of the lock tooth are provided with tapers.

15. A seat slide rail structure as defined in claim 14, wherein the spring means consist of a pair of coil springs fitted over the lock shaft with the lock member located between the two coil springs, and engaged to the lock member at one ends thereof and to the slider at the other ends thereof.

16. A seat slide rail structure as defined in claim 8, wherein a plurality of lock teeth are formed in a free end of the lock member which is rotatably supported by the lock lever shaft, and at least one of the lock teeth is adapted to substantially closely fit into the lock holes while at least one other lock tooth is adapted to loosely fit into the lock holes.

17. A seat slide rail device, comprising: a pair of seat slide rail structures, arranged in mutually parallel relationship between a seat and a floor along a fore-and-aft direction, each comprising a lower rail having a channel member with a substantially C-shaped cross-section fixedly attached to a floor surface and having an open side end; a slider, fixedly secured to a seat, having a vertical portion opposing the open side end of the lower rail and combined with the lower rail in axially slidable manner by way of a bearing member; and a lock member rotatably supported by the slider by way of a lock shaft and adapted to be rotated by an actuating means, the lock shaft of the first seat slide rail structure consisting of a lock lever shaft which may be manually rotated and to which the lock member having at least one lock tooth at its free end is fixedly secured the bearing member being fixedly secured to the slider and positioned inside the lower rail; the lock lever shaft positioned inside the lower rail and rotatably supported on the slider by the bearing member; the lock shaft of the second seat slide rail structure consisting of a lock shaft rotatably supporting the lock member having at least one lock tooth at its free end so that the lock member of the second seat slide rail structure may be actuated in synchronization with the lock member of the first seat slide rail structure by way of a displacement transmitting means; so that the slide position of the seat may be adjustable by selective engagement of the lock tooth formed in the free end of the lock member with the lock holes provided in the lower rail in each of the seat slide rail structures, wherein:
the lock tooth of the second seat slide rail structure is provided with a greater taper than the lock tooth of the first seat slide rail structure.

18. A seat slide rail device as defined in claim 17, wherein the lock member of the second seat slide rail structure is axially movable relative to the slider and biased by spring means in an axial direction, and a taper is provided at least in a leading edge of a free end of the lock tooth whereby, when the taper of the lock tooth is pressed against a periphery of one of the lock holes, the lock member may displace along the axial direction against the spring force of the spring means.

19. A seat slide rail structure as defined in claim 17, wherein the lock holes of at least one of the seat slide rail structures are provided in the lower member depending from the lower rail and the lock tooth is adapted to fit into the lock holes, passing through a slot, which is provided in a vertical portion of the slider opposing one of the surfaces of the lower member, at the same time.

20. A seat slide rail device as defined in claim 19, wherein the lock tooth further passes through a notch or a hole provided in a free end of the slider extension opposing the other surface of the lower member.

21. A seat slide rail device as defined in claim 17, wherein a plurality of lock teeth are formed in a free end of the lock member, which is rotatably supported by the lock shaft, of at least one of the seat slide rail structures, and at least one of the lock teeth is adapted to substantially closely fit into the lock holes while at least one other lock tooth is adapted to loosely fit into the lock holes.

22. A seat slide rail device as defined in claim 21, wherein at least a leading edge of the closely fitting tooth is provided with a taper.

23. A seat slide rail device as defined in claim 21, wherein a trailing edge of the loosely fitting tooth is substantially without any taper.

* * * * *